(12) United States Patent
Mankame et al.

(10) Patent No.: US 9,978,226 B1
(45) Date of Patent: May 22, 2018

(54) REMOTELY-DRIVEN HAPTIC DEVICE

(71) Applicant: GM GLOBAL TECHNOLOGY OPERATIONS LLC, Detroit, MI (US)

(72) Inventors: Nilesh D. Mankame, Ann Arbor, MI (US); Paul W. Alexander, Ypsilanti, MI (US); Raymond J. Kiefer, Huntington Woods, MI (US); Blagoj Dungevski, Sterling Heights, MI (US); Richard J. Skurkis, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/423,054

(22) Filed: Feb. 2, 2017

(51) Int. Cl.
*H04B 3/36* (2006.01)
*G08B 6/00* (2006.01)
*B60N 2/44* (2006.01)

(52) U.S. Cl.
CPC .............. *G08B 6/00* (2013.01); *B60N 2/449* (2013.01); *B60N 2002/4485* (2013.01)

(58) Field of Classification Search
CPC ... G08B 6/00; B60N 2/449; B60N 2002/4485
See application file for complete search history.

(56) References Cited

U.S. PATENT DOCUMENTS

| | | | | |
|---|---|---|---|---|
| 6,125,583 A | * | 10/2000 | Murray | E05B 81/20 49/291 |
| 7,245,231 B2 | | 7/2007 | Kiefer et al. | |
| 7,317,978 B2 | * | 1/2008 | Ashizawa | B60K 6/48 701/51 |
| 8,512,264 B1 | * | 8/2013 | Asfora | A61H 23/0263 601/46 |
| 8,621,959 B2 | | 1/2014 | Brown et al. | |
| 8,970,358 B2 | | 3/2015 | Kiefer et al. | |
| 9,123,215 B2 | | 9/2015 | Kiefer et al. | |
| 9,132,774 B2 | | 9/2015 | Kiefer et al. | |
| 9,153,108 B2 | | 10/2015 | Kiefer et al. | |
| 9,266,451 B2 | | 2/2016 | Kiefer et al. | |
| 9,286,773 B2 | | 3/2016 | McQueen et al. | |
| 9,349,263 B2 | | 5/2016 | Kiefer et al. | |
| 9,421,908 B2 | | 8/2016 | McQueen et al. | |
| 9,493,116 B2 | | 11/2016 | Kiefer et al. | |
| 9,607,491 B1 | * | 3/2017 | Mortimer | G08B 6/00 |
| 2007/0080934 A1 | * | 4/2007 | Chen | G06F 3/0383 345/156 |
| 2009/0067885 A1 | * | 3/2009 | Hsu | G03G 21/1647 399/258 |
| 2009/0082705 A1 | * | 3/2009 | Asfora | A61H 19/00 601/46 |
| 2013/0342366 A1 | * | 12/2013 | Kiefer | G08B 6/00 340/901 |
| 2014/0224228 A1 | * | 8/2014 | Benjey | B60K 6/485 123/559.3 |
| 2015/0290076 A1 | * | 10/2015 | Hobbs | A61H 39/007 601/46 |
| 2016/0376980 A1 | * | 12/2016 | Du | F02B 41/06 123/52.1 |
| 2017/0177083 A1 | * | 6/2017 | Alghooneh | G06F 3/016 |

* cited by examiner

*Primary Examiner* — Erin M File
(74) *Attorney, Agent, or Firm* — Quinn IP Law

(57) ABSTRACT

A device for haptically communicating to an individual includes a haptic unit that is operatively coupled to a remotely located actuator to effect a haptic pulse signal.

13 Claims, 4 Drawing Sheets

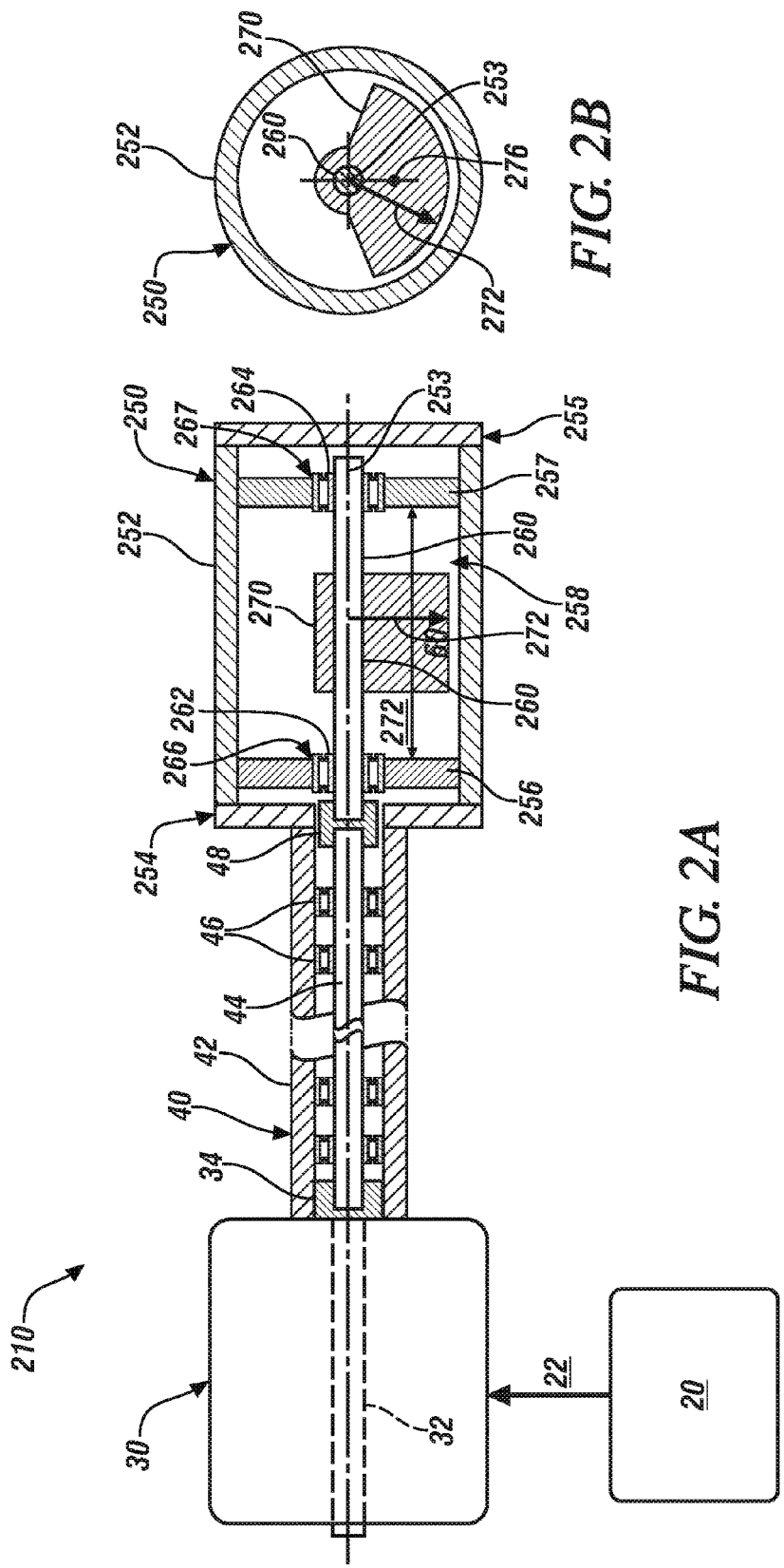

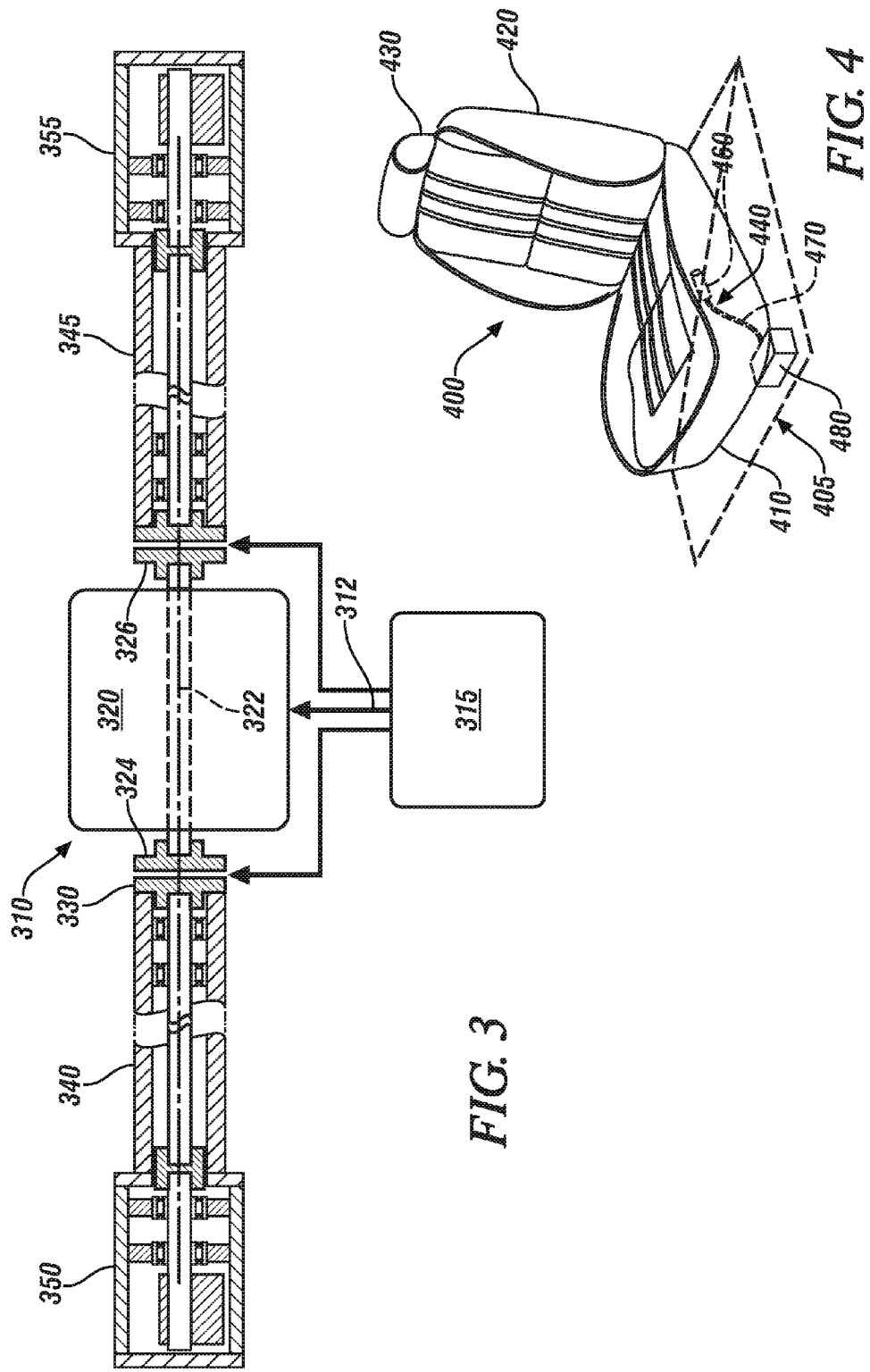

REMOTELY-DRIVEN HAPTIC DEVICE

Haptic devices may be employed in devices to communicate with individuals, including by way of non-limiting example, communicating to a vehicle driver. Haptic devices may be stand-alone communication devices, or may be used in combination with visual and/or auditory devices.

SUMMARY

A device for haptically communicating to an individual is described, and includes a haptic unit that is operatively coupled to a remotely located actuator to effect a haptic pulse signal.

An aspect of the disclosure includes the haptic unit being operatively coupled to the remotely located actuator via a flexible drive shaft.

Another aspect of the disclosure includes the flexible driveshaft including a rotatable shaft disposed within a casing.

Another aspect of the disclosure includes the rotatable shaft of the flexible driveshaft being selectively coupled to the actuator via a controllable clutch.

Another aspect of the disclosure includes the remotely-located actuator including an electric motor.

Another aspect of the disclosure includes a controller operatively connected to the actuator.

Another aspect of the disclosure includes the controller being disposed to communicate a control signal to the actuator such that the actuator operates the haptic unit to generate the haptic pulse signal.

Another aspect of the disclosure includes the haptic unit including an eccentric mass element that is coupled to a shaft element, is rotatable about a longitudinal axis and is disposed in a housing.

Another aspect of the disclosure includes the haptic unit including first and second bearings that are configured to support the shaft element and the eccentric mass in the casing, wherein the eccentric mass element is supported in a cantilevered arrangement.

Another aspect of the disclosure includes a longitudinal spacing between the first and second bearings being determined based upon a desired level of vibration in the haptic unit.

Another aspect of the disclosure includes the eccentric mass including a semi-cylindrical element having a radius and an eccentrically-located center of mass, wherein the radius and the center of mass are determined based upon a desired level of vibration in the haptic unit.

Another aspect of the disclosure includes the controller being disposed to communicate a control signal to the actuator, wherein the actuator is disposed to rotate the eccentric mass in response to the control signal such that the haptic unit is able to generate the desired level of vibration in the haptic unit.

Another aspect of the disclosure includes the haptic unit including first and second bearings that are configured to support the shaft element and the eccentric mass in the casing, wherein the eccentric mass element is supported in a straddled arrangement.

Another aspect of the disclosure includes the haptic unit including an eccentric mass that is coupled to a shaft element, is rotatable about a longitudinal axis and is disposed in a housing, wherein the controller is disposed to communicate a control signal to control the actuator, and wherein the actuator is disposed to rotate the eccentric mass about the longitudinal axis in response to the control signal from the controller.

Another aspect of the disclosure includes the haptic unit being operatively coupled to the remotely-located actuator via a flexible drive shaft, wherein the remotely-located actuator includes a solenoid device that is controllable to generate reciprocating linear movement, wherein the flexible driveshaft includes a translatable shaft disposed within a casing, wherein the haptic unit includes a mechanism disposed to convert the reciprocating linear movement that is generated by the remotely-located actuator to rotational movement, and wherein the haptic unit includes an eccentric mass element that is coupled to a shaft element, is rotatable about a longitudinal axis and is disposed in a housing.

Another aspect of the disclosure includes the haptic unit being disposed in one of a seat bolster, a side seatback location, a side headrest location of a seat or a side portion of a hand-held device.

Another aspect of the disclosure includes a device disposed to generate a haptic pulse, including a first haptic unit couplable via a first clutch to an actuator and a second haptic unit couplable via a second clutch to the actuator, wherein the first haptic unit is rotatably couplable to the actuator via activation of the first clutch to generate the haptic pulse, and wherein the second haptic unit is rotatably couplable to the actuator via activation of the second clutch to generate the haptic pulse.

Another aspect of the disclosure includes the haptic unit being located in one of a seat bolster, a side seatback location and a side headrest location of a driver's seat or side portion of a steering wheel of a vehicle.

Another aspect of the disclosure includes a seat being disposed on a floor section, and including a seat member including a first side having a first bolster and a second side having a second bolster, a first haptic unit disposed in the first bolster and operatively coupled to a remotely located first actuator, a second haptic unit disposed in the second bolster and operatively coupled to a remotely located second actuator, and a controller, disposed to communicate control signals to the first and second actuators. The first and second actuators are disposed to operate the respective first and second haptic units in response to the control signal such that the respective first and second haptic units are able to generate a haptic pulse that is discernible by an occupant of the seat.

Another aspect of the disclosure includes the seat member including one of a seat bottom, a seat back, or a head rest.

Another aspect of the disclosure includes the remotely located first and second actuators being disposed on the floor section.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIGS. 2A and 2B schematically illustrate a side-view and an end-view, respectively, of another embodiment of a remotely-driven haptic device including a haptic device that is operatively coupled to a remotely-located actuator, in accordance with the disclosure;

FIG. 3 schematically illustrates another embodiment of a remotely-driven haptic device, including first and second haptic units that are selectively operatively coupled to a single, remotely-located actuator, in accordance with the disclosure;

FIG. 4 is a three-dimensional isometric drawing of a seat assembly, including a lower seat member, a seat back member, a head rest, and a remotely-driven haptic device disposed therein, in accordance with the disclosure.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure. Furthermore, the drawings are in simplified form and are not to precise scale. For purposes of convenience and clarity only, directional terms such as left, right, upper, lower, rear and front may be used with respect to the drawings. These and similar directional terms are not to be construed to limit the scope of the disclosure. Furthermore, the disclosure, as illustrated and described herein, may be practiced in the absence of an element that is not specifically disclosed herein.

Figures 1A, 1B:
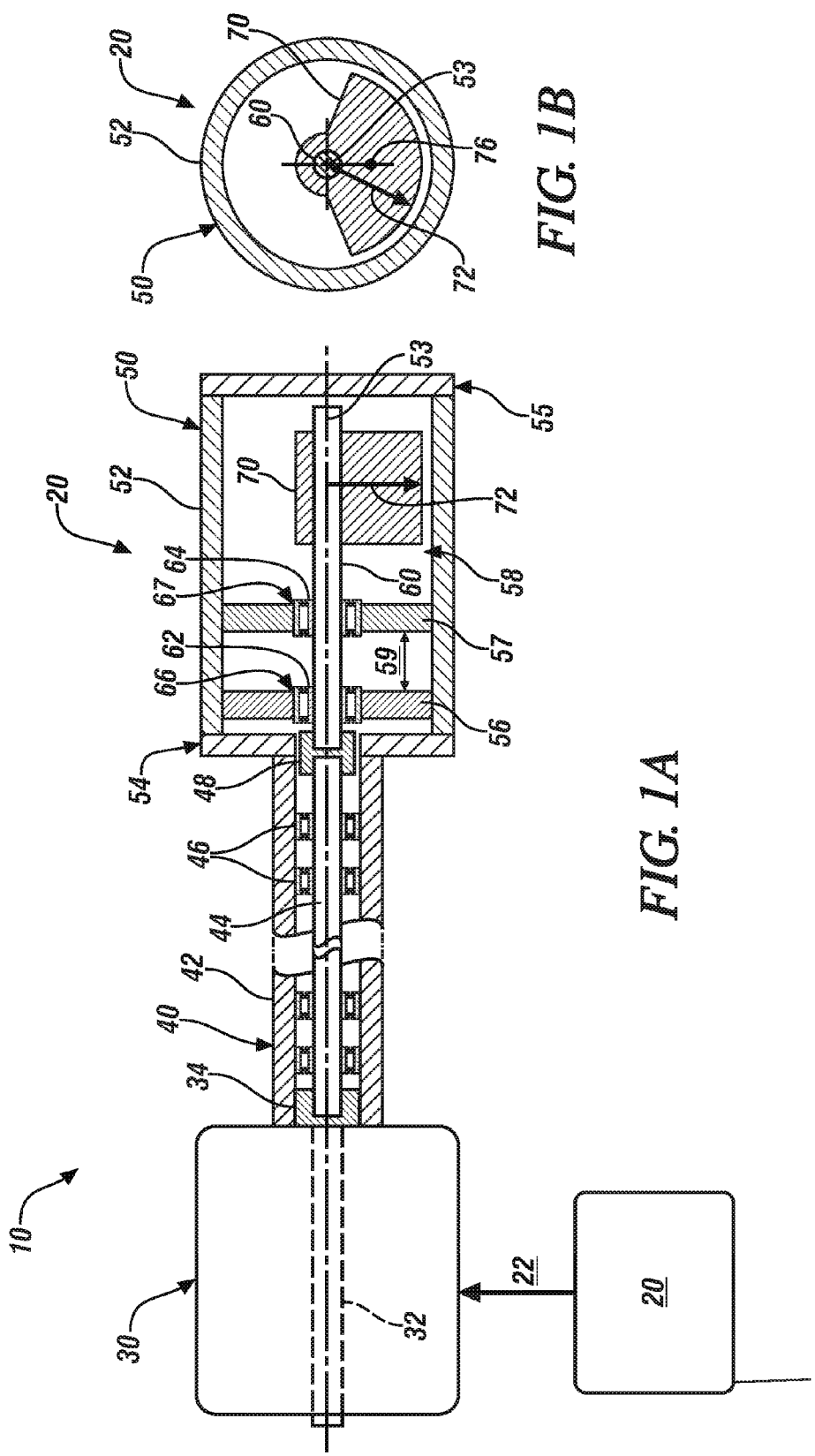
FIGS. 1A and 1B schematically illustrate a side-view and an end-view, respectively, of an embodiment of a remotely-driven haptic device including a haptic device that is operatively coupled to a remotely-located actuator, in accordance with the disclosure.

Referring to the drawings, wherein like reference numerals correspond to like or similar components throughout the several Figures, FIGS. 1A and 1B, consistent with embodiments disclosed herein, illustrate a remotely-driven haptic device 10 that may be employed to haptically communicate to an individual. The remotely-driven haptic device 10 includes a haptic unit 50 that is operatively coupled to a remotely-located actuator 30, wherein the haptic unit 50 is configured to generate a haptically-discernible or tactilely-discernible message when actuated by the remotely-located actuator 30. The terms "remotely-driven" and "remotely-located" are employed to indicate that the haptic unit 50 is not located in the same physical package as the actuator 30. As such, the actuator 30 does not occupy the same packaging space as the haptic unit 50, which allows the package envelope for the haptic unit 50 to be physically compact, and thus reduces the likelihood that the haptic unit 50 becomes discernible to an individual when not being operated to send a message to the individual. Furthermore, the physically compact package envelope for the haptic unit 50 facilitates employment of multiple devices, thus improving the quality and discernibility of directional information that can be communicated to the individual.

Haptic communication is defined as a form of communication in which a tactilely-discernible message is generated, preferably for communication to an individual that is located in the vicinity of the haptic device 10. The tactilely discernible message may be location-specific, such as to a specific area of an individual's body, as described with reference to FIG. 4. Haptic communication can be in the form of haptic feedback or a vibration alert. Haptic feedback includes haptic pulses that are generated by the haptic device 10 in the form of a multi-frequency vibration pattern, wherein the haptic pulses may be varied in terms of duration of time, spacing, intensity, and quantity of repetitions. The haptic pulses are intended to convey information. A vibration alert may include a haptic pulse in the form of a single-frequency vibration that operates for an elapsed period of time, and is intended to alert an individual.

One or more of the remotely-driven haptic devices 10 may be disposed in a specific location of a passenger seat that is disposed in a passenger compartment of a vehicle. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Alternatively, the remotely-driven haptic device 10 may be disposed in a simulator device such as a cockpit simulator for one of the aforementioned mobile platforms. Alternatively, the remotely-driven haptic device 10 may be disposed in a video game simulator that may include a seat, a helmet, a wearable suit, or a hand-held device. Non-limiting examples of disposition of the remotely-driven haptic device 10 may include a seat bolster, a seat pan, a side seatback location, or a side headrest location of a driver's or passenger seat or a steering wheel of a vehicle. Alternatively, the remotely-driven haptic device 10 may be disposed in an instrument panel or another user interface. Alternatively, the remotely-driven haptic device 10 may be disposed in a medical rehabilitation device to provide mechanical stimulation to a patient to counteract effects of extended periods of time in bed.

The remotely-driven haptic device 10 shown with reference to FIG. 1 includes a haptic unit 50 that is operatively coupled to the remotely-located actuator 30, and the remotely-located actuator 30 is in communication with a controller 20. In one embodiment, and as shown the haptic unit 50 is operatively coupled to the remotely-located actuator 30 via a flexible drive shaft 40.

The haptic unit 50 includes a cylindrically-shaped housing 52 that defines a longitudinal axis 53 and includes a first end 54, a second end 55, a first bearing mount 56 and a second bearing mount 57. The housing 52 defines an inner open portion 58. The first bearing mount 56 and the second bearing mount 57 are radially-oriented planar surfaces that are disposed in the housing 52. The first bearing mount 56 is disposed at a first distance L1 59 from the second bearing mount 57, and the second bearing mount 57 is disposed at a second distance L2 65 from the second end 55 of the housing 52. The first and second bearing mounts 56, 57 define first and second cylindrically-shaped voids or openings 66, 67, respectively, that are coaxial with the longitudinal axis 53. The housing 52 may be fabricated from a rigid polymeric material or another suitable material.

A center shaft 60 is disposed in the housing 52 along the longitudinal axis 53, and includes a first bearing 62 that is disposed in the first opening 66 and supported by the first bearing mount 56, and a second bearing 64 that is disposed in the second opening 67 and supported by the second bearing mount 57. The center shaft 60 and first and second bearings 62, 64 may be fabricated from steel alloy or another suitable material. In one embodiment, the first and second bearings 62, 64 are sleeve bearings that are fabricated from suitable material. A portion of the center shaft 60 projects longitudinally into the inner open portion 58 of the housing 52. An eccentric mass element 70 is attached to the portion of the center shaft 60 that projects longitudinally into the inner open portion 58 of the housing 52. In this embodiment, the eccentric mass element 70 is supported in the housing 52 in a cantilevered arrangement by the mounting of the center shaft 60 at the first and second bearing mounts 56, 57. A distal end of the center shaft 60 is disposed near the second end 55 of the housing 52 and is unsupported. The first distance L1 59 between the first and second bearing mounts 56, 57 defines a bearing spacing. When arranged in the cantilevered configuration, the bearing spacing can be selected to amplify the vibration signal when the haptic unit 50 is decoupled from the actuator 30. When the flexible drive shaft 40 is employed, the force produced by the rotating eccentric mass element has a higher effective acceleration at the casing of the eccentric mass.

In one embodiment, the eccentric mass element 70 is a semi-cylindrical device that is disposed on the center shaft 60, and is defined in terms of an outer radius 72 relative to the longitudinal axis 53, a longitudinal length and a center of mass 76 that is eccentric to the longitudinal axis 53. The center shaft 60 rotates about the longitudinal axis 53 such that the eccentric mass element 70 rotates within the housing 52 of the haptic unit 50. A magnitude of vibration generated by the rotation of the eccentric mass element 70 may be determined based upon its outer radius 72, its mass 76 and the rotational speed.

The flexible driveshaft 40 includes a flexible rotatable shaft 44 that is disposed within a flexible casing 42, and may include shaft bearings 46. A first end of the driveshaft 40 is coupled to the center shaft 60 of the haptic unit 50, and a second end of the driveshaft 40 is coupled to the motor shaft 32 of the electric motor 30, in one embodiment.

Figure 5:
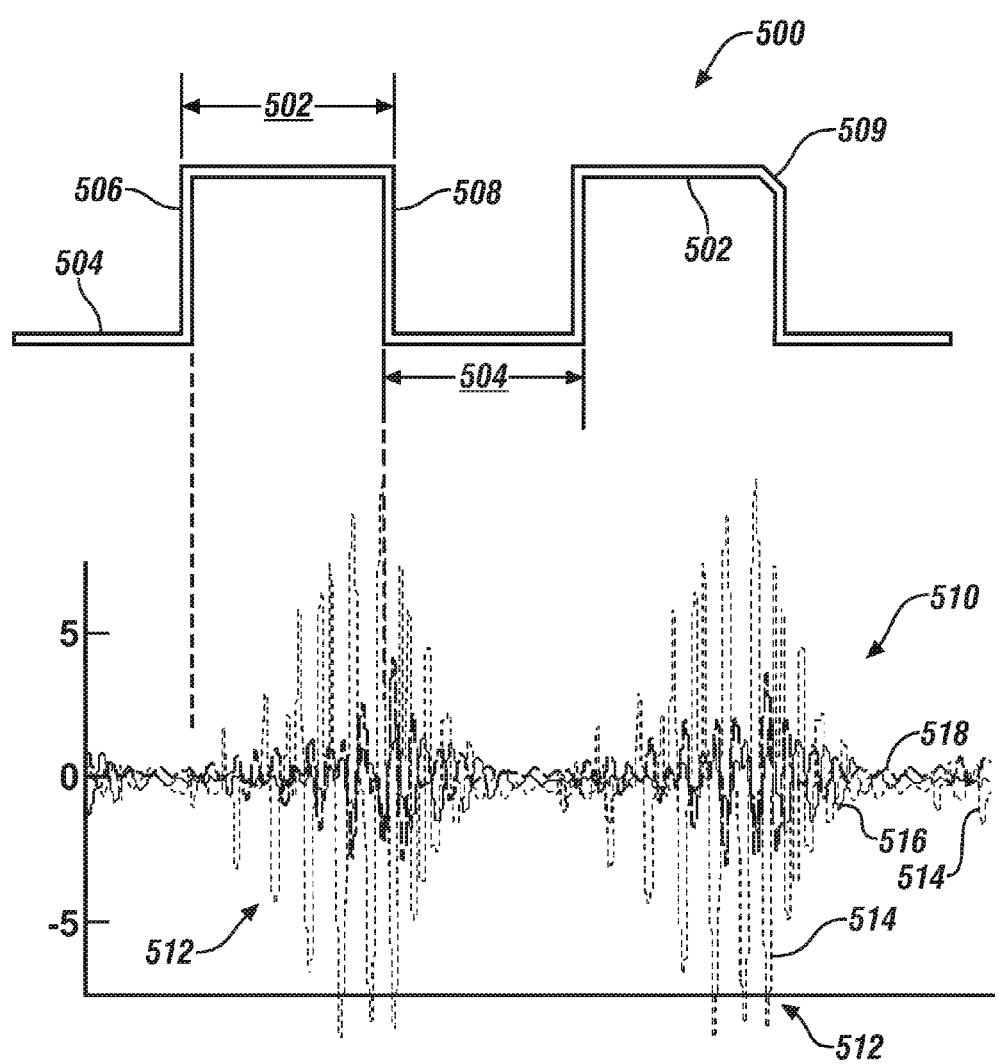
FIG. 5 graphically shows haptic pulse signals that can be associated with haptic communication employing an embodiment of the remotely-driven haptic device described herein, wherein the haptic pulse signals include an actuation profile and an acceleration profile that can be sent to the remotely-driven haptic device to control the intensity and duration of haptic communication, in accordance with the disclosure.

The remotely-located actuator 30 may be an electric motor that includes a rotatable motor shaft 32 in one embodiment. The remotely-located actuator 30 may be a permanent-magnet electric motor that is configured to operate at low voltage levels in response to a control command 22 that originates with the controller 20. FIG. 5 graphically shows one example of the control command 22. Alternatively, the remotely-located actuator 30 is a linear solenoid that is disposed to generate a reciprocating linear motion, and the flexible driveshaft 40 includes a shaft element that is disposed to translate in a reciprocating fashion, with a distal end attached to an embodiment of the haptic unit 50. In such an arrangement, the haptic unit 50 is configured with a device (not shown) that converts the reciprocating linear motion of the flexible driveshaft 40 into rotational motion that is transferred to the center shaft 60 to cause it to rotate about the longitudinal axis 53 with the eccentric mass element 70.

FIGS. 2A and 2B schematically illustrate another embodiment of a remotely-driven haptic device 210 that may be employed to haptically communicate to an individual. The remotely-driven haptic device 210 includes a haptic unit 250 that may be operatively coupled to the remotely-located actuator 30, and the remotely-located actuator 30 is in communication with the controller 20. In one embodiment, and as shown the haptic unit 250 is operatively coupled to the remotely-located actuator 30 via the flexible drive shaft 40.

The haptic unit 250 includes a cylindrically-shaped housing 252 that defines a longitudinal axis 253 and includes a first end 254, a second end 255, a first bearing mount 256 and a second bearing mount 257. The housing 252 defines an inner open portion 258. The first bearing mount 256 and the second bearing mount 257 are radially-oriented planar surfaces that are disposed in the housing 252. The first bearing mount 256 is disposed at or near the first end 254 of the housing 252, and the second bearing mount 257 is disposed at or near the second end 255 of the housing 252. The first and second bearing mounts 256, 257 define first and second cylindrically-shaped voids or openings 266, 267, respectively, that are coaxial with the longitudinal axis 253. The housing 252 may be fabricated from a rigid polymeric material or another suitable material.

A center shaft 260 is disposed in the housing 252 along the longitudinal axis 253, and includes a first bearing 262 that is disposed in the first opening 266 and supported by the first bearing mount 256, and a second bearing 264 that is disposed in the second opening 267 and supported by the second bearing mount 257. The center shaft 260 and first and second bearings 262, 264 may be fabricated from steel alloy or another suitable material. In one embodiment, the first and second bearings 262, 264 are sleeve bearings that are fabricated from suitable material. A portion of the center shaft 260 projects longitudinally into the inner open portion 258 of the housing 252. An eccentric mass element 270 is attached to the portion of the center shaft 260 that projects longitudinally into the inner open portion 258 of the housing 252. In this embodiment, the eccentric mass element 270 is supported in the housing 252 in a straddled arrangement between the first and second bearing mounts 256, 257.

In one embodiment, the eccentric mass element 270 is a semi-cylindrical device that is disposed on the center shaft 260, and is defined in terms of an outer radius 272 relative to the longitudinal axis 253, a longitudinal length and a center of mass 276 that is eccentric to the longitudinal axis 253. The center shaft 260 rotates about the longitudinal axis 253 such that the eccentric mass element 270 rotates within the housing 252 of the haptic unit 250. A magnitude of vibration generated by the rotation of the eccentric mass element 270 may be determined based upon its outer radius 272, its mass 276 and the rotational speed.

FIG. 3 schematically illustrates another embodiment of a remotely-driven haptic device 310 that may be employed to haptically communicate to an individual. The remotely-driven haptic device 310 includes first and second haptic units 350, 355, respectively, which can be placed at a suitable location and selectively operatively coupled to a single, remotely-located actuator 320 via first and second controllable clutches 330, 335, respectively. In one embodiment, and as shown the first haptic unit 350 is operatively coupled to the remotely-located actuator 320 via the first flexible drive shaft 340 when the first controllable clutch 330 is activated. In a similar manner, the second haptic unit 355 is operatively coupled to the remotely-located actuator 320 via the second flexible drive shaft 345 when the second controllable clutch 335 is activated. In one configuration, as shown, the actuator 320 includes a rotatable motor shaft 322 that includes a first end 324 and a second end 326. The first end 324 is coupled to the first clutch 330, and the second end 326 is coupled to the second clutch 335. The actuator 320 and the first and second clutches 330, 335 are in communication with and controlled by the controller 315, including a control command 312 that can be communicated to the actuator 320 in the form of a PWM signal. The actuator 320 may activate either one of or both of the first and second haptic units 350, 355 by selective activation of the respective first and second controllable clutch 330, 335. Each of the first and second controllable clutches 330, 335 may be normally-activated, or alternatively, normally-deactivated clutches, with such selection being application-specific. Other embodiments of the clutch configuration may be employed, and multiple haptic units may be selectively connected to the actuator 320 and operationally controlled by the controller 315.

FIG. 4 is a three-dimensional isometric drawing of a seat assembly 400 that may be employed in a vehicle or a simulator to accommodate an occupant such as a passenger or a driver. The seat assembly 400 includes a lower seat member 410, a seat back member 420, a head rest 430, and a remotely-driven haptic device 440, such as an embodiment of the remotely-driven haptic devices that are described with reference to FIG. 1, 2 or 3. The lower seat member 410 is placed on and secured to a floor pan 405, which may be a part of a vehicle body in one embodiment. The remotely-driven haptic device 440 includes a haptic unit 450 that may be operatively coupled to a remotely-located actuator 460 via a flexible driveshaft 470, and the remotely-located actuator 460 is in communication with a controller 480. The lower seat member 410 defines a generally horizontal surface for supporting an occupant (not shown). The seat back member 420 may be pivotally coupled to the lower seat member 410 and may define a generally vertical surface for supporting the back of an occupant. The head rest 430 is operatively coupled to the seat back member 420 to support the head of an occupant. Although not shown, the lower seat member 410, the seat back member 420, and the head rest 430 are each formed by a foam body mounted on a frame and covered with a cover. It is appreciated that there may be multiple remotely-driven haptic devices 440 disposed in various locations of the seat assembly, including left and right sides of each of the lower seat member 410, the seat back member 420 and the head rest 430. A single remotely-driven haptic device 440 is shown, with the haptic unit 450 installed in a bolster of the lower seat member 410, with the remotely-located actuator 460 disposed on the floor pan 405. The flexible driveshaft 470 is threaded between the haptic unit 450 and the remotely-located actuator 460. The remotely-driven haptic device 440 may be a part of a driver alert system that is disposed to alert a driver of an impending risk, and/or may be part of a haptic feedback system that is disposed to indicate to the driver that an automatic vehicle control action (e.g., brake, or steer) is being undertaken.

FIG. 5 graphically shows haptic pulse signals that can be associated with haptic communication that can be conveyed to an individual, employing an embodiment of the remotely-driven haptic device 10. The haptic pulse signals include an actuation profile 500 and an acceleration profile 510, wherein the actuation profile 500 represents a commanded actuation signal that can be employed to control the intensity and duration of haptic communication through the remotely-driven haptic device 10. The commanded actuation signal can be described in terms of peak voltages, duty cycle and frequency. Multiple haptic pulse signals may be generated. The actuation profile may represent a signal generated by the haptic controller 20 to operate the remotely-located actuator 30 to activate the haptic unit 50 that is described with reference to FIG. 1. The actuation profile 500 includes an active period 502 and an inactive period 504. The active period 502 may be defined by a positive voltage signal generated by the haptic controller 20 and the inactive period 504 may correspond to a low or zero voltage signal generated by the haptic controller 20. Each active period 502 has a leading edge 506 and a trailing edge 508. In some embodiments, the leading edge 506 and/or the trailing edge 508 may include a taper 509 to adjust the acceleration profile of the haptic pulse signal. During the active period 502, the haptic controller 20 is commanding the remotely-located actuator 30 to rotate and thus activate the remotely-driven haptic device 50. During the inactive period 504, the haptic controller 20 is not commanding the remotely-located actuator 30 to rotate. The active period 502 is a representation of the signal applied to the remotely-located actuator 30, and may include rapidly repeating PWM sequences.

The acceleration profile 510 indicates acceleration at a surface of an embodiment of a seat bolster when the haptic unit 50 is located in one of the seat bolsters. For example, the acceleration profile 510 may be measured with an accelerometer placed at the surface of the seat bolster to measure acceleration due to actuation. The acceleration profile 510 illustrates haptic pulses 512 that are varied in length and spacing to haptically signal the seat occupant. The haptic signal generated by the haptic pulses 512 indicates the type of haptic signal. The acceleration profile 510 includes first direction data 514, second direction data 516, and third direction data 518. In the embodiment illustrated, the first direction data 514 corresponds to acceleration measured normal to the seat bolster surface, the second direction data 516 corresponds to acceleration measured at the surface of the bolster in a fore-aft direction with respect to the motor, and the third direction data 518 corresponds to acceleration measured at the surface of the bolster in a lateral direction perpendicular to the vertical and fore-aft directions.

In one exemplary embodiment, the peak amplitude of measured vertical acceleration at the activated actuator location normal to the seat bolster surface is at least five times greater than the peak amplitude of the measured acceleration in the vertical, fore-aft, and lateral directions at non-activated actuator locations. Moreover, by way of example, the actuation profile may be adjusted to generate a desired acceleration profile felt by variously sized drivers. For example, a high frequency component of the vibration corresponding to the rotational speed of the remotely-located actuator 30 may be within the range of 55 to 67 Hz. The high frequency component is also selected to reduce undesirable interactions with road vibration frequencies. The vertical acceleration of the vibration may be between 50 and 72 m/s2. In one example, the vertical acceleration level is within 10% across each of the actuator locations.

In general, the acceleration profile 510 at the seat bolster increases during the active period 502 of the actuation profile 500 and decreases during the inactive period 504 of the actuation profile 500. The relative duration of the active period 502 and inactive period 504 of the actuation profile 500 may be used to indicate the severity of a potential hazard. Additionally, the time between active periods 502 and inactive periods 504 may be decreased to indicate more urgent alerts. For example, unique haptic alert actuation profiles 500 may be used to distinguish between near-field imminent events and far-field advisory events that may occur beyond the driver's line of sight. As such, the vibrations from the remotely-located actuator 30 may be highly localized.

When the remotely-driven haptic device 10 is employed in a driver's seat of a vehicle, the relative durations of the active period and inactive period may be used to indicate the severity of the potential hazard, and/or the time between active periods and inactive periods may be decreased to indicate more urgent alerts, such as the difference between near-field imminent alarms and far-field advisory events that may occur beyond the driver's line of sight. Distinction between urgent and non-urgent alerts may be communicated by varying the haptic feedback to the driver. For example, the number of pulses, pulse on and pulse off cycle patterns, pulse signatures, pulse intensity, pulse location, and/or number of repetitions may be varied to produce various alerts. As an example, when an object is first detected, a single pulse or unique pulse signature may be provided, and as the vehicle moves closer to the object, the separation time between pulses (or pulse signatures) is decreased until a minimum separation time is reached. The intensity settings for the proximity alerts may be distinct from the alarm settings to reduce customer discomfort or annoyance.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic instructions to control operation of actuators. Communication between controllers, and communication between controllers, actuators and/or sensors may be accomplished using a direct wired point-to-point link, a networked communication bus link, a wireless link or another suitable communication link. Communication includes exchanging data signals in a suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form. A parameter is defined as a measurable quantity that represents a physical property of a device or other element that is discernible using one or more sensors and/or a physical model. A parameter can have a discrete value, e.g., either "1" or "0", or can be infinitely variable in value.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A device for haptically communicating to an individual, comprising a haptic unit that is operatively coupled to a remotely located actuator to effect a haptic pulse signal;
wherein the haptic unit comprises an eccentric mass element that is coupled to a shaft element, is rotatable about a longitudinal axis and is disposed in a housing, and first and second bearings that are configured to support the shaft element and the eccentric mass in the housing; and
wherein the eccentric mass element is supported in a cantilevered arrangement.

2. The device of claim 1, further comprising the haptic unit being operatively coupled to the remotely located actuator via a flexible drive shaft.

3. The device of claim 2, wherein the flexible driveshaft includes a rotatable shaft disposed within a casing.

4. The device of claim 3, wherein the rotatable shaft of the flexible driveshaft is selectively coupled to the actuator via a controllable clutch.

5. The device of claim 1, wherein the remotely-located actuator comprises an electric motor.

6. The device of claim 5:
wherein the haptic unit comprises an eccentric mass that is coupled to a shaft element, is rotatable about a longitudinal axis and is disposed in a housing;
wherein the controller is disposed to communicate a control signal to control the actuator; and
wherein the actuator is disposed to rotate the eccentric mass about the longitudinal axis in response to the control signal from the controller.

7. The device of claim 1, further comprising a controller operatively connected to the actuator.

8. The device of claim 7, wherein the controller is disposed to communicate a control signal to the actuator such that the actuator operates the haptic unit to generate the haptic pulse signal.

9. The device of claim 1, wherein a longitudinal spacing between the first and second bearings is determined based upon a desired level of vibration in the haptic unit.

10. The device of claim 1, wherein the eccentric mass comprises a semi-cylindrical element having a radius and an eccentrically-located center of mass, wherein the radius and the center of mass are determined based upon a desired level of vibration in the haptic unit.

11. The device of claim 10, further comprising a controller disposed to communicate a control signal to the actuator, wherein the actuator is disposed to rotate the eccentric mass in response to the control signal such that the haptic unit is able to generate the desired level of vibration in the haptic unit.

12. A device for haptically communicating to an individual, comprising:

a haptic unit that is operatively coupled to a remotely located actuator to effect a haptic pulse signal, wherein the haptic unit comprises:

an eccentric mass element that is coupled to a shaft element, is rotatable about a longitudinal axis and is disposed in a housing; and first and second bearings that are configured to support the shaft element and the eccentric mass in the housing, wherein the eccentric mass element is supported in a straddled arrangement.

13. A device for haptically communicating to an individual, comprising:

a haptic unit that is operatively coupled to a remotely located actuator to effect a haptic pulse signal;

wherein the haptic unit is operatively coupled to the remotely-located actuator via a flexible drive shaft;

wherein the remotely-located actuator comprises a solenoid device that is controllable to generate reciprocating linear movement;

wherein the flexible driveshaft includes a translatable shaft disposed within a casing;

wherein the haptic unit includes a mechanism disposed to convert the reciprocating linear movement that is generated by the remotely-located actuator to rotational movement; and wherein the haptic unit includes an eccentric mass element that is coupled to a shaft element, is rotatable about a longitudinal axis and is disposed in a housing.

* * * * *